United States Patent [19]

Berny

[11] Patent Number: 5,161,701
[45] Date of Patent: Nov. 10, 1992

[54] INSTALLATION SHELF ARRANGEMENT OR LIKE STORAGE APPARATUS IN PARTICULAR FOR LONG MATERIAL

[75] Inventor: Roger Berny, Zollikon, Switzerland

[73] Assignee: Sipag Storage Systems and Industrial Products AG, Zurich, Switzerland

[21] Appl. No.: 569,864

[22] Filed: Aug. 20, 1990

[30] Foreign Application Priority Data

Sep. 12, 1989 [DE] Fed. Rep. of Germany ....... 3930391
Oct. 19, 1989 [DE] Fed. Rep. of Germany ....... 3934851

[51] Int. Cl.⁵ ............................................. A47F 5/00
[52] U.S. Cl. .................................. 211/193; 211/192; 108/108
[58] Field of Search ............... 211/193, 192, 189, 191; 108/108, 109

[56] References Cited

U.S. PATENT DOCUMENTS

| | | | |
|---|---|---|---|
| 3,358,847 | 12/1967 | Magnuson | 211/189 |
| 4,286,719 | 9/1981 | Hall | 211/193 |
| 4,396,125 | 8/1983 | Rowader | 211/193 |
| 4,426,011 | 1/1984 | Jay | 211/193 |
| 4,648,517 | 3/1987 | Schafer | 211/189 X |

FOREIGN PATENT DOCUMENTS 915635 11/1972 Canada ........................ 211/193

Primary Examiner—Robert W. Gibson, Jr.
Attorney, Agent, or Firm—Bachman & LaPointe

[57] ABSTRACT

An installation shelf arrangement or like storage arrangement comprising cantilever arms projecting substantially horizontally from substantially vertical uprights, in particular for the storage of long material, wherein the cantilever arms are each connected to the respective upright by a bolt-like member which passes through openings in the cantilever arm and apertures in the upright is to be simplified and made suitable for use for higher loads. For that purpose the upright (14) which carries the cantilever arms (16) has two channel-like profiles (24) which face towards each other with their open sides, and at least one transverse member (26, 27) which connects the profiles at a spacing (a) and which is fixed at both ends to a pair of substantially aligned profile limbs (38). In that arrangement the channel-like profile (24) is to be provided in its end wall (36) with at least one longitudinal bead (34) which is directed towards the interior of the profile and which extends substantially parallel to the limbs (38) of the profile which adjoin the end wall thereof.

20 Claims, 3 Drawing Sheets

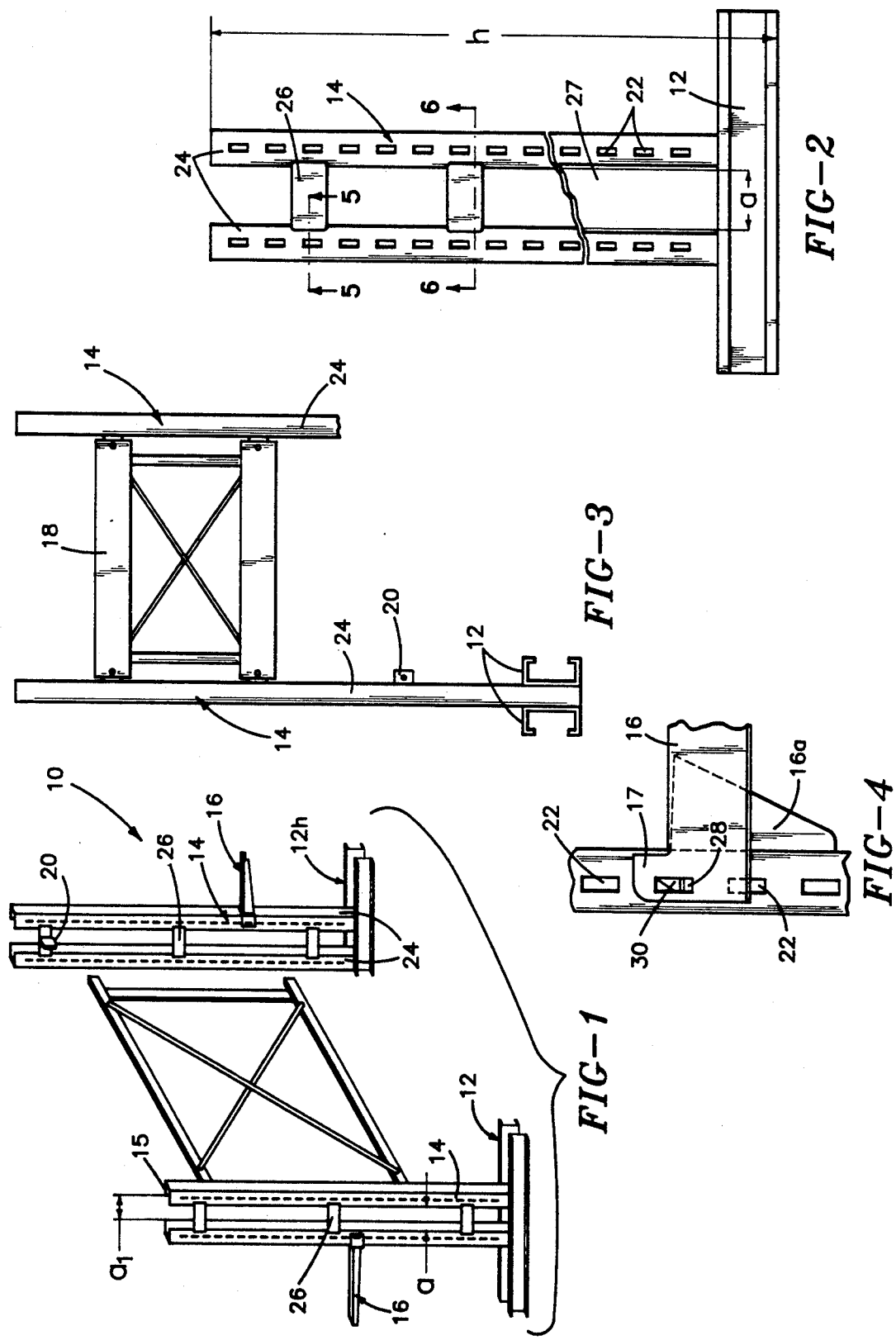

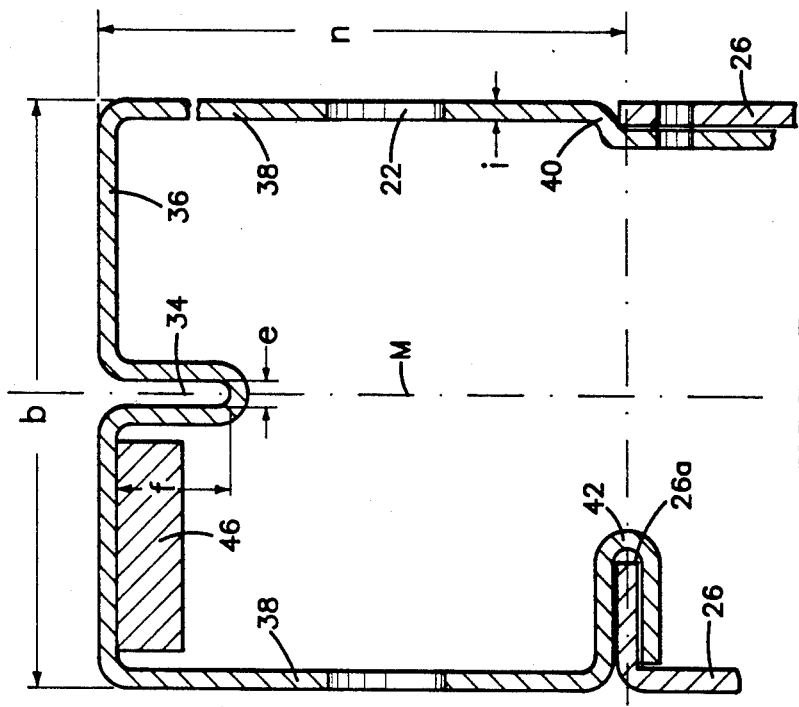
FIG-5
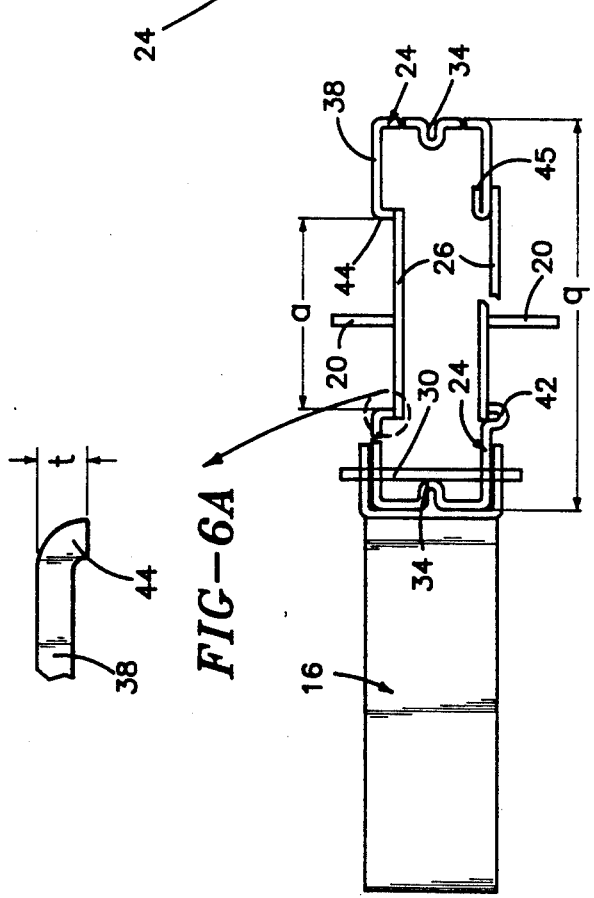
FIG-6
FIG-6A
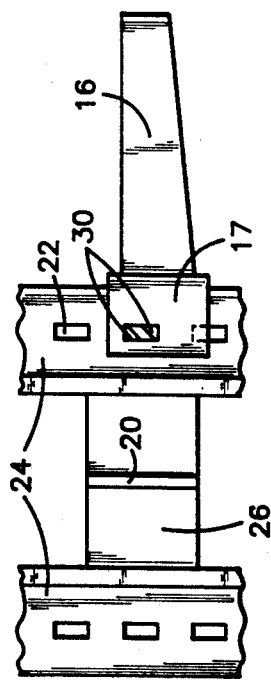
FIG-7

INSTALLATION SHELF ARRANGEMENT OR LIKE STORAGE APPARATUS IN PARTICULAR FOR LONG MATERIAL

BACKGROUND OF THE INVENTION

The invention relates to an installation shelf arrangement or like storage arrangement comprising cantilever arms or brackets which project substantially horizontally from substantially vertical uprights, in particular for the storage of long material. In that storage arrangement, the cantilever arms or brackets may each be connected to the upright by a bolt-like member which passes through openings in the cantilever arm and apertures in the support, wherein the bolt-like member extends transversely with respect to the longitudinal direction of the cantilever arm.

An arrangement of that kind is disclosed in the specification on German Utility Model No. 35b 19 49 343 by reference to an installation shelf arrangement in which the cantilever arms are fixed in a vertical support by means of a screw bolt. At a spacing from that connection point a vertical limb of the support arm profile extends in the form of a support means at the outside of the vertical support. It has been found that that configuration suffers from the disadvantage that, when assembling the shelf arrangement which is fitted with compartment members for small loads, the bores in the cantilever arm and in the vertical support have to be precisely aligned in order to be able to insert the bolt. A nut then also has to be screwed onto the bolt.

A shelf arrangement which is quick to assemble or a connecting system therefor, which is suitable for storage systems for heavy loads, is described in German laid-open application (DE-OS) No 31 03 983. In that shelf arrangement both the apertures in the support and also the opening in the cantilever arm are of rectangular cross-section with side edges extending in the direction of the loading, and the bolt-like member is in the form of a wedge profile member with a cross-section substantially in the form of a right-angled triangle, the hypotenuse of which bears against the hypotenuse of a wedge profile member of the same cross-sectional configuration which is introduced in opposite relationship. The longitudinal edge which lies at the right cross-sectional angle of the wedge profile member is rounded off and the longitudinal edge which is at the smallest angle thereof is chamfered.

SUMMARY OF THE INVENTION

The inventor set himself the aim of simplifying the structure of such shelf arrangements or storage arrangements and extending the area of use thereof. In particular the invention seeks to provide for optimisation of the production of the uprights.

That object is attained in that the upright which carries the cantilever arms or brackets has two channel-like profiles which face towards each other with their open sides and at least one transverse member which connects said profiles at a spacing and which is fixed at both ends to a pair of substantially aligned limbs of said U-shaped profiles. In that arrangement at least one longitudinal bead of small width, which is formed in the end wall of the profile, with the depth thereof being a multiple of the width, is of particular significance; the longitudinal bead decisively enhances the stiffness of the channel-like profile and makes it possible to use comparatively thin steel plates or sheets in producing the profiles.

The U-shaped profile according to the invention is provided in the region of at least one limb with said transverse members which are either crossbar-like transverse strips or continuous transverse plates, and is connected by way thereof to a second U-shaped profile. In that configuration the horizontal width of the transverse members determines the width of the finished upright.

It has been found to be particularly desirable that, by virtue of the described construction, without involving particular expense, it is possible to produce uprights of a width which decreases upwardly.

In regard to further features concerning in particular the fixed or releasable connection of the transverse members to the profiles, attention is directed to the subsidiary claims.

The preferred profile widths are 102 mm and 152 mm with a sheet metal thickness of about 3 mm in each case and a depth in respect of the longitudinal bead of from 20 to 24 mm. The limb lengths then measure about 100 mm. In particular loading situations, flat steel strips for reinforcement purposes may also be welded on both sides of the longitudinal bead to the inward surface of the end wall of the profiles.

BRIEF DESCRIPTION OF THE DRAWINGS

Further advantages, features and details of the invention will be apparent from the following description of preferred embodiments and with reference to the drawings in which:

FIG. 1 is a perspective view of a shelf or rack system with vertically directed uprights on horizontal supports and with support arms, FIG. 2 is a side view of an upright in two embodiments, on a larger scale than FIG. 1, FIG. 3 is a front view of the FIG. 2 structure, FIG. 4 is a side view of a detail from FIG. 1 on an enlarged scale, FIG. 5 is a view in horizontal section through a profile of the upright taken along line V—V in FIG. 2 on approximately natural scale, for two embodiments, FIG. 6 is a view in cross-section approximately along line VI—VI in FIG. 2, in respect of two different constructions, FIG. 7 is a side view of part of the FIG. 6 structure.

DETAILED DESCRIPTION

Figures 8, 9:
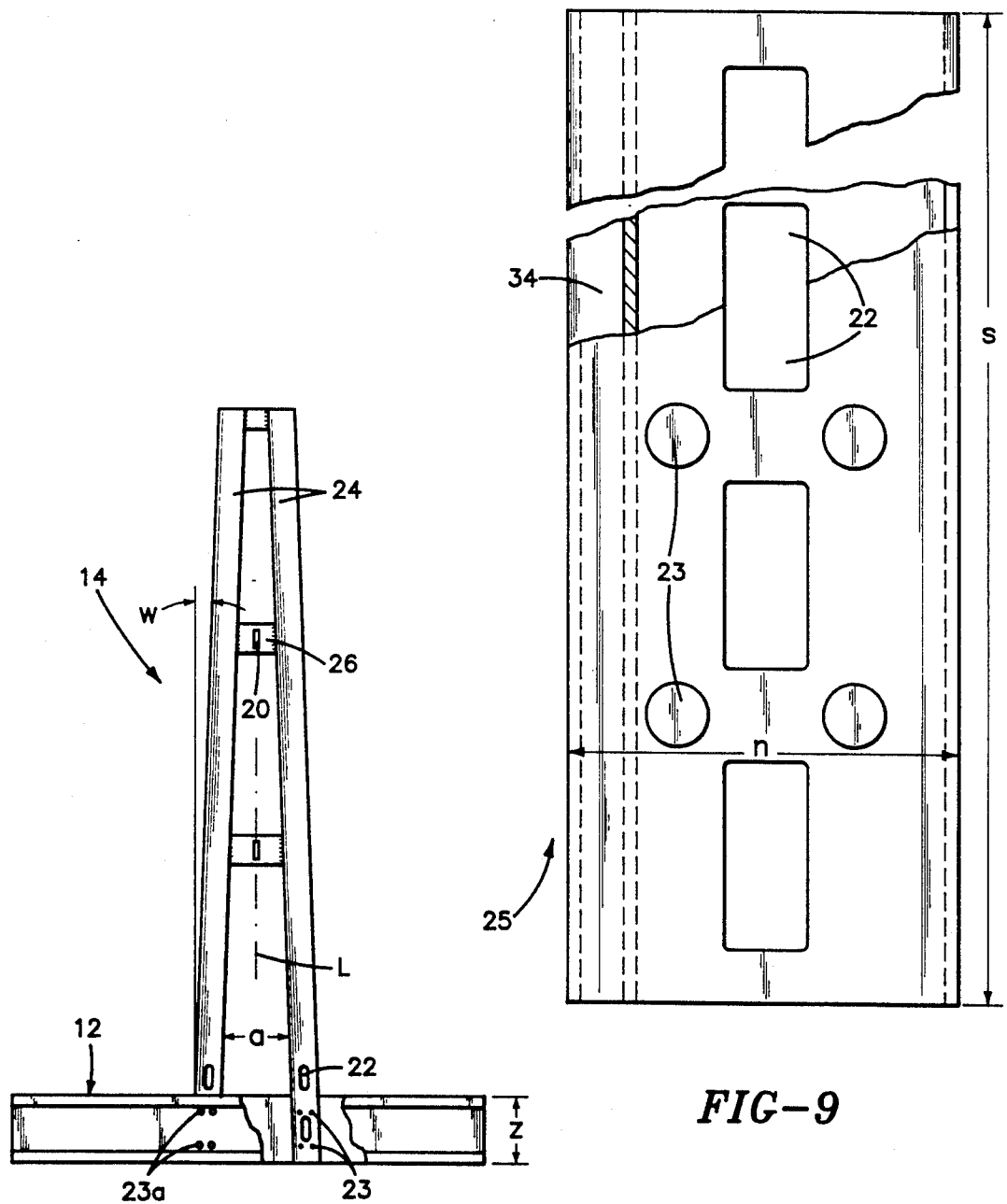
FIG. 8 is another embodiment of the FIG. 2 structure.
FIG. 9 is a plan view of a semimanufactured member for profiles.

A shelf or rack system 10 for long material which is not shown in the drawing for the sake of clarity thereof such as bars, profile members, plates or the like has uprights 14 which stand up from single-sided horizontal supports $12_h$ or double-sided horizontal supports 12, with cantilever arms or brackets 16 releasably secured thereto.

Each two uprights 14 are connected by trussing frameworks 18 which are screwed to side bar portions 20 of the uprights 14. As shown in FIG. 1, each of the uprights 14 is composed of two channels or U-shaped profiles 24 which are provided with vertical slots 22 and which face towards each other with their openings, and transverse metal plates 26 which connect the U-shaped profiles 24 together; the lower profile spacing as indicated at $a_l$ is longer than the upper profile spacing as indicated at $a_l$, in other words, the upright 14 tapers towards its upper end 15.

As shown in FIG. 4, fitted into the slots 22 in the U-shaped profiles 24 and into corresponding apertures 28 in side limb bars 17 of the cantilever arm 16 are pairs of wedge profiles 30 which are each of triangular cross-section, the wedge profiles 30 being inserted in mutually opposite relationship and acting as connecting members. Associated support brackets are identified by reference $16_a$. In other respects, further details of this arrangement are to be found in German laid-open application (DE-OS) No 31 03 983.

In an embodiment as illustrated at the bottom of FIG. 2, instead of the crossbar-like transverse plates 26, the assembly has a continuous transverse plate 27 so as to provide a box configuration which is open at the inward side or which, when using a pair of transverse plates, is closed, and which, as described, can be of a tapering configuration.

As shown in FIG. 5, the U-shaped profile 24 which is rolled from metal sheet or plate of a thickness i of for example 3 mm is provided on its line of symmetry M with a bead 34 extending in the longitudinal direction. The width e of the longitudinal bead 34 approximately corresponds to said thickness i, while the depth f thereof measures 20 mm with a profile width as indicated at b of about 100 mm. If the profile width b is altered (for example to 150 mm), the width or dimension e of the longitudinal bead 34 is nonetheless maintained. The longitudinal bead stabilises the entire U-shaped profile 24 and permits it to carry substantially higher loading forces. Such forces endeavour to drive the lower edges of the side limb bars or shoes 17 into the U-shaped profiles 24; that is resisted by the longitudinal bead 34.

The two limbs 38 of the profile, which join the end wall 36 thereof, with the limbs being of a length as indicated at n of about 100 mm, are provided towards their ends with a cranked portion 40 or an end bead 42; at both those configurations 40 and 42 the transverse plate members 26 or the transverse plates 27 are connected thereto for example by screwing or welding or by an angled edge $26_a$ being inserted into the end bead 42.

In accordance with an embodiment as shown in FIG. 6, the end bead 42 may be directed outwardly, instead of being directed inwardly as shown in FIG. 5; when the end bead 42 is directed outwardly, the transverse plate members 20 are welded or inserted on the inward side. In the second structure as shown in the top part of FIG. 6, the limbs 38 of the profile have their edges turned over at their ends and provide internal flanges 44 for welding the transverse plate members 26 thereto. A detail on an enlarged scale in FIG. 6 shows an internal flange 44 which is bent in a part-circular configuration, with an outside length as indicated at t of 6 mm. In the structure shown at bottom right in FIG. 6, the limb end 45 is bent inwardly and lies against the inward surface of the limb; that example, with the transverse plate member 26, results in a bar-like region of a welded three-layer configuration.

Here the limb 38 of the profile is formed from 2 mm sheet metal with a profile width b of 102 mm and with a width e of the longitudinal bead 34 of about the same thickness i as the sheet metal; when using greater sheet metal thicknesses i, the bead width e is selected to correspond to the dimension i.

The overall width q of the uprights 14, with loads of 2000 kg and 4500 kg, measures between 250 and 350 mm in the vicinity of the floor, with heights h of about 4 m to over 6 m. Such an upright 14 which is of a height $h_1$ of about 4 m tapers in that case in FIG. 1 for example from 250 mm to 190 mm, or by 15 mm per meter of its height. In order to strengthen the U-shaped profiles 24, flat profile members 46 may also be mounted in same on the inward side thereof.

In all situations the result is a shelf or rack system 10 of extremely high stability even when the sheet metal thickness i is comparatively thin. In addition the channel members or U-shaped profiles 24 used may be roll-formed or the like, in an uncomplicated procedure.

The U-shaped profiles 24 of the upright 14 in FIG. 8 are each inclined at an angle w of about 0.5° with respect to the vertical longitudinal axis L, which corresponds to about 1.75% of a height h of 4000 mm.

Provided in the region of the height z of the horizontal supports 12 in this embodiment in the U-shaped profile 24 are four bores 23 for connecting screws (not shown) (M 16×25) which pass through corresponding holes $23_a$ in the horizontal support 12.

FIG. 9 shows a profile bar or extrusion 25 of a length s for example of 12037 mm, from which the U-shaped profiles 24 are cut to length.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. An installation shelf arrangement comprising cantilever arms (16) projecting substantially horizontally from substantially vertical uprights (14) wherein the cantilever arms are each connected to the respective upright by a bolt-like member (30) which passes through openings in the cantilever arm and apertures in the upright, wherein the bolt-like member (30) extends transversely with respect to the longitudinal direction of the cantilever arm, characterized in that the upright (14) which carries the cantilever arms (16) has two channel-like profiles (24) which face towards each other with their open sides, and at least one transverse member (26, 27) which connects the profiles at a spacing (a) and which is fixed at both ends to a pair of substantially aligned profile limbs (38) and further characterised in that at least one of the channel-like profiles (24) is provided in its end wall (36) with at least one longitudinal bead (34) which is directed towards the interior of the profile and which extends substantially parallel to the profile limbs (38) which adjoin the profile end wall (36).

2. An installation shelf arrangement comprising cantilever arms (16) projecting substantially horizontally from substantially vertical uprights (14) wherein the cantilever arms are each connected to the respective upright by a bolt-like member (30) which passes through openings in the cantilever arm and apertures in the upright, wherein the bolt-like member (30) extends transversely with respect to the longitudinal direction of the cantilever arm, characterized in that the upright (14) which carries the cantilever arms (16) has two channel-like profiles (24) which face towards each other with their open sides, and at least one transverse member (26, 27) which connects the profiles at a spacing (a) and which is fixed at both ends to a pair of substantially aligned profile limbs (38) and further characterised in that at least one of the profile limbs (38) of the profile (24) has an end bead (42) which is directed transversely with respect to the centre line (M) of the profile, for the connection of a transverse member (26, 27).

3. An installation shelf arrangement comprising cantilever arms (16) projecting substantially horizontally from substantially vertical uprights (14) wherein the cantilever arms are each connected to the respective upright by a bolt-like member (30) which passes through openings in the cantilever arm and apertures in the upright, wherein the bolt-like member (30) extends transversely with respect to the longitudinal direction of the cantilever arm, characterized in that the upright (14) which carries the cantilever arms (16) has two channel-like profiles (24) which face towards each other with their open sides, and at least one transverse member (26, 27) which connects the profiles at a spacing (a) and which is fixed at both ends to a pair of substantially aligned profile limbs (38) and further characterised in that an internal flange (44) is bent over from at least one of the limbs (38) of the profile (24) and is connected to a transverse member (26, 27).

4. An installation shelf arrangement comprising cantilever arms (16) projecting substantially horizontally from substantially vertical uprights (14) wherein the cantilever arms are each connected to the respective upright by a bolt-like member (30) which passes through openings in the cantilever arm and apertures in the upright, wherein the bolt-like member (30) extends transversely with respect to the longitudinal direction of the cantilever arm, characterized in that the upright (14) which carries the cantilever arms (16) has two channel-like profiles (24) which face towards each other with their open sides, and at least one transverse member (26, 27) which connects the profiles at a spacing (a) and which is fixed at both ends to a pair of substantially aligned profile limbs (38) and further characterised in that at least one of the channel-like profiles (24) is provided in its end wall (36) with at least one longitudinal bead (34) which is directed towards the interior of the profile and which extends substantially parallel to the profile limbs (38) which adjoin the profile and end wall (36) and further including reinforcing strips (46) at the inward side of the end wall (36) of the profile, the strips extending on both sides of the longitudinal bead (34).

5. A shelf arrangement according to claim 1 characterised in that the width (e) of the longitudinal bead (34) substantially corresponds to the thickness of the profile walls (36, 38).

6. A shelf arrangement according to claim 5 characterised in that the depth (f) of the longitudinal bead (34) corresponds at least to six times the width (e) thereof.

7. A shelf arrangement according to claim 6 characterised in that the longitudinal bead (34) extends on the centre line (M) of the profile (24).

8. A shelf arrangement according to claim 2 characterised in that an angular edge ($26_a$) or the like of the transverse member (26, 27) is adapted to be inserted into the end bead (42).

9. A shelf arrangement according to claim 8 characterised in that at least one of the limbs (38) of the profile (24) has an outwardly directed end bead (42) to which the transverse member (26, 27) is welded on the inside thereof.

10. A shelf arrangement according to claim 9 characterised in that the width of the end bead (42) corresponds to the width (e) of the longitudinal bead (34).

11. A shelf arrangement according to claim 2 characterised in that the edge of the end (45) of the limb (38) of the profile is turned over until it lies against same and with the transverse member (26, 27) forms a triple-layer strip portion.

12. A shelf arrangement according to claim 1 characterised in that at least one of the limbs (38) of the profile (24), as an abutment for a transverse member (26, 27), has an inwardly displaced cranked portion (40), with the transverse member preferably being screwed thereto.

13. A shelf arrangement according to claim 1 characterised in that the transverse members are transverse strips (26) which are arranged in a crossbar-like arrangement or continuous transverse plates (27).

14. A shelf arrangement according to claim 13 characterised by reinforcing strips (46) at the inward side of the end wall (36) of the profile, the strips extending on both sides of the longitudinal bead (34).

15. A shelf arrangement according to claim 14 characterised in that the upright (14) tapers upwardly in the plane defined by its cantilever arms (16), from a base-like horizontal support (12, $12_h$).

16. A shelf arrangement according to claim 15 characterised in that the width (q) of the upright (14) tapers upwardly by 4% to 8% per meter of height (h), preferably 6% per meter.

17. A shelf arrangement according to claim 16 characterised in that the profile (24) is inclined at an angle (w) of about 0.5° with respect to the longitudinal axis (L) of the upright (14).

18. A shelf arrangement according to claim 17 characterised in that each two profiles (24) are screwed to respective horizontal supports (12).

19. A shelf arrangement according to claim 18 characterised in that the profile (24) and the horizontal support (12) are cut to length from a profile bar (25) which is provided with bores (23) for the screw means and with apertures (26) for the transverse members (27).

20. A shelf arrangement according to claim 1 characterised in that the channel-like profile (24) or the profile bar (25) is roll-shaped from sheet steel.

* * * * *